(12) United States Patent
Li (10) Patent No.: US 11,862,813 B2
(45) Date of Patent: Jan. 2, 2024

(54) SEPARATOR, AND ELECTROCHEMICAL DEVICE AND ELECTRONIC DEVICE COMPRISING SAME

(71) Applicant: Ningde Amperex Technology Limited, Ningde (CN)

(72) Inventor: Zhaojin Li, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 17/558,006

(22) Filed: Dec. 21, 2021

(65) Prior Publication Data

US 2022/0115741 A1 Apr. 14, 2022

Related U.S. Application Data

(63) Continuation of application No. 16/564,592, filed on Sep. 9, 2019, now Pat. No. 11,276,902.

(30) Foreign Application Priority Data

Mar. 27, 2019 (CN) .......................... 201910237734.4

(51) Int. Cl.
*H01M 50/449* (2021.01)
*H01M 50/411* (2021.01)
(Continued)

(52) U.S. Cl.
CPC ..... *H01M 50/446* (2021.01); *H01M 10/0525* (2013.01); *H01M 10/4235* (2013.01);
(Continued)

(58) Field of Classification Search
None
See application file for complete search history.

(56) References Cited

U.S. PATENT DOCUMENTS

| 4,849,311 A * | 7/1989 | Itoh ..................... H01M 8/0289 429/317 |
| 10,804,519 B2 | 10/2020 | Yoon et al. |

(Continued)

FOREIGN PATENT DOCUMENTS

| CN | 101267028 A | 9/2008 |
| CN | 102311559 A | 1/2012 |

(Continued)

OTHER PUBLICATIONS

First Office Action of CN Application No. 201910237734.4, dated Jun. 28, 2021.
(Continued)

*Primary Examiner* — Ula C Ruddock
*Assistant Examiner* — Mary Grace Byram
(74) *Attorney, Agent, or Firm* — Ladas & Parry LLP (57) ABSTRACT

The present application relates to a composite separator, and an electrochemical device and an electronic device comprising the same. Some embodiments of the present application provide a composite separator, comprising: a first porous substrate and a cation exchange layer, wherein the cation exchange layer comprises a second porous substrate grafted with a functional group, wherein the functional group is selected from the group consisting of an alkali-metal-sulfonic functional group, an alkali-metal-phosphoric functional group and a combination thereof. The composite separator of the present application can effectively capture the transition metal ions eluted from a cathode through the cation exchange layer, thereby reducing the deposition of the transition metal ions on an anode and the self-discharge rate of the electrochemical device. Therefore, the electrochemical stability and cycling performance of the electrochemical device are enhanced, and the safety of the electrochemical device is also significantly improved.

18 Claims, 3 Drawing Sheets

(51) Int. Cl.
*H01M 50/446* (2021.01)
*H01M 10/0525* (2010.01)
*H01M 50/403* (2021.01)
*H01M 10/42* (2006.01)
*H01M 50/426* (2021.01)
*H01M 50/42* (2021.01)
*H01M 50/417* (2021.01)
*H01M 50/489* (2021.01)
*H01M 50/457* (2021.01)
*H01M 50/451* (2021.01)

(52) U.S. Cl.
CPC ......... *H01M 50/417* (2021.01); *H01M 50/42* (2021.01); *H01M 50/426* (2021.01); *H01M 50/451* (2021.01); *H01M 50/457* (2021.01); *H01M 50/489* (2021.01); *H01M 50/403* (2021.01)

(56) References Cited

U.S. PATENT DOCUMENTS

| | | | |
|---|---|---|---|
| 2013/0149588 A1 | 6/2013 | Garsuch et al. | |
| 2013/0244082 A1 | 9/2013 | Lee et al. | |
| 2015/0349307 A1 | 12/2015 | Dadheech et al. | |
| 2017/0365883 A1* | 12/2017 | Luski | H01M 50/414 |
| 2018/0254449 A1 | 9/2018 | Xiao et al. | |
| 2019/0237734 A1* | 8/2019 | Lee | H01M 10/0525 |

FOREIGN PATENT DOCUMENTS

| | | |
|---|---|---|
| CN | 103493253 A | 1/2014 |
| CN | 103579560 A | 2/2014 |
| CN | 106299195 A | 1/2017 |
| CN | 107528085 A | 12/2017 |
| CN | 107636881 A | 1/2018 |
| CN | 109314207 A | 2/2019 |
| JP | 200593123 A | 4/2005 |
| JP | 2009087795 A | 4/2009 |

OTHER PUBLICATIONS

Second Office Action of CN Application No. 201910237734.4, dated Feb. 7, 2022.

Notification to Grant Patent Right of CN Application No. 201910237734.4, dated Aug. 2, 2022.

* cited by examiner

SEPARATOR, AND ELECTROCHEMICAL DEVICE AND ELECTRONIC DEVICE COMPRISING SAME

CROSS REFERENCE TO RELATED APPLICATIONS

The present application is a continuation application of U.S. patent application Ser. No. 16/564,592 filed Sep. 9, 2019, which claims the benefit of priority from Chinese Patent Application No. 201910237734.4, filed on 27 Mar. 2019. The disclosures of the aforementioned patent applications are hereby incorporated by reference in their entirety.

TECHNICAL FIELD

The present application relates to the technical field of energy storage, and in particular, to a composite separator, and an electrochemical device and an electronic device comprising the same.

BACKGROUND

With the popularity of consumer electronics products such as notebook computers, mobile phones, handheld game consoles, tablet computers, mobile power supplies and drones, the requirements for electrochemical devices (for example, lithium-ion batteries) are ever more stringent. For example, people require not only lighter weight but also high battery capacity and long service life from the batteries. Among the numerous types of batteries, lithium ion batteries have taken up an established position in the market due to their outstanding advantages such as high energy density, good safety, low self-discharge, no memory effect, and long service life. However, due to the growing demand for higher energy density of lithium ion batteries, applying higher voltage to a cathode active material is increasing, resulting in an unstable structure of the cathode active material, thereby releasing more transition metal ions at a high voltage. The transition metal ions may further form lithium dendrites on an anode, thus running the risk of piercing the separator.

In order to improve electrochemical stability and cycling performance inside the electrochemical device, the use of a composite separator is one feasible solution. Therefore, in order to further improve the safety of electrochemical devices, it is necessary to further improve and design the structure and material of the composite separator.

SUMMARY

The present application provides a composite separator, and an electrochemical device and an electronic device comprising the same to solve at least one of the problems in the related art at least to some extent.

According to a first aspect of the present application, the present application provides a composite separator, comprising: a first porous substrate and a cation exchange layer, wherein the cation exchange layer comprises a second porous substrate grafted with a functional group, wherein the functional group is selected from the group consisting of an alkali-metal-sulfonic functional group, an alkali-metal-phosphoric functional group and a combination thereof.

According to some embodiments, the composite separator further comprises a first coating, wherein the first coating comprises inorganic particles and a binder.

According to some embodiments, the composite separator further comprises a second coating, the second coating comprising a polymer binder.

According to some embodiments, the polymer binder is selected from the group consisting of a vinylidene fluoride-hexafluoropropylene copolymer, a vinylidene fluoride-trichloroethylene copolymer, polyacrylate ester, polyacrylic acid, polymethyl methacrylate, polyvinylidene fluoride, polyacrylonitrile, polytetrafluoroethylene, polyhexafluoropropylene, a styrene-butadiene copolymer and combinations thereof.

According to some embodiments, the first coating is disposed between the first porous substrate and the cation exchange layer.

According to some embodiments, the second coating is disposed between the first coating and the cation exchange layer.

According to some embodiments, the cation exchange layer is disposed between the first porous substrate and the first coating.

According to some embodiments, the second coating is disposed on a surface of the first coating.

According to some embodiments, the second porous substrate is selected from the group consisting of polyethylene, polypropylene, polyethylene terephthalate, polyimide, an ethylene-styrene copolymer, polysulfone, polyetheretherketone, polystyrene and combinations thereof.

According to some embodiments, a grafting concentration of the functional group is from about 0.15 mmol/g to about 0.95 mmol/g.

According to some embodiments, the thickness of the cation exchange layer is from about 0.5 μm to about 10 μm.

According to a second aspect of the present application, the present application provides a composite separator, comprising: a first porous substrate and a cation exchange layer, wherein the cation exchange layer comprises a polymer binder grafted with a functional group, wherein the functional group is selected from the group consisting of an alkali-metal-sulfonic functional group, an alkali-metal-phosphoric functional group and a combination thereof.

According to some embodiments, the composite separator further comprises a first coating, wherein the first coating comprises inorganic particles and a binder, and the first coating is disposed between the first porous substrate and the cation exchange layer.

According to some embodiments, the polymer binder is selected from the group consisting of a vinylidene fluoride-hexafluoropropylene copolymer, a vinylidene fluoride-trichloroethylene copolymer, polyacrylate ester, polyacrylic acid, polymethyl methacrylate, polyvinylidene fluoride, polyacrylonitrile, polytetrafluoroethylene, polyhexafluoropropylene, a styrene-butadiene copolymer and combinations thereof.

According to some embodiments, a grafting concentration of the functional group is from about 0.15 mmol/g to about 0.95 mmol/g.

According to some embodiments, the thickness of the cation exchange layer is from about 0.5 μm to about 10 μm.

According to a third aspect of the present application, the present application provides an electrochemical device, comprising: a cathode, an anode and the composite separator in the above embodiments, wherein the composite separator is disposed between the cathode and the anode.

According to a fourth aspect of the present application, the present application provides an electronic device, comprising the electrochemical device described above.

Additional aspects and advantages of the embodiments of the present application will be partially described, illustrated or explained by way of examples in the descriptions as follows.

BRIEF DESCRIPTION OF THE DRAWINGS

To describe the embodiments of this application, the following briefly describes the accompanying drawings required for describing the embodiments of this application or the prior art. In particular, the accompanying drawings in the following descriptions are merely some embodiments of this application, and persons skilled in the art may still derive drawings of other embodiments from examples of structures shown in these accompanying drawings without creative efforts.

DETAILED DESCRIPTION

Embodiments of this application are described below in detail. Throughout the entire specification of this application, same or similar components or components having same or similar functions are represented by using similar reference numerals. The embodiments related to the accompanying drawings that are described herein are illustrative and schematic, and are used to provide a basic understanding of this application. The embodiments of this application should not be construed as limitations to this application.

As used in this application, the terms "about", "roughly", "substantially", "essentially", and "approximately" are used for describing and explaining a small variation. When being used in combination with an event or a case, the terms can refer to an example in which the event or case exactly occurs, or an example in which the event or case similarly occurs. For example, when being used in combination with a value, the terms may refer to a variation range being less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "substantially" the same or "approximate".

In this specification, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and derived wordings thereof (such as "horizontally", "downward", and "upward") should be construed as referenced directions described in discussion or shown in the accompanying drawings. These relativistic wordings are merely for ease of description, and require constructing or operating this application in a particular direction.

Furthermore, for ease of description, the terms "first", "second", "third", and the like may be used for distinguishing between different components in a diagram or a series of diagrams. The terms "first", "second", "third", and the like are not intended to describe corresponding components.

In addition, amounts, ratios and other numerical values are sometimes presented herein in a range format. It should be appreciated that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

Embodiments of the present application provide a composite separator and an electrochemical device comprising the same, the composite separator comprising a first porous substrate; and a cation exchange layer, wherein the cation exchange layer comprises a material layer grafted with a functional group, wherein the functional group is selected from the group consisting of an alkali-metal-sulfonic functional group, an alkali-metal-phosphoric functional group and a combination thereof. The cation exchange layer can capture transition metal ions eluted from a cathode, and can effectively increase the transition metal capture rate of the separator in the electrochemical device. At the same time, the present application effectively reduces electrical conductivity of the composite separator by providing various structural forms of the first porous substrate and the cation exchange layer, thereby reducing the self-discharge rate of the electrochemical device. Therefore, the electrochemical stability and cycling performance of the electrochemical device are enhanced, and the safety of the electrochemical device is also significantly improved.

The structure and the material composition of the composite separator in the various embodiments of the present application, as well as the configuration of the composite separator in an electrode assembly, will be further described below in conjunction with FIGS. 1-3.

Figure 1:
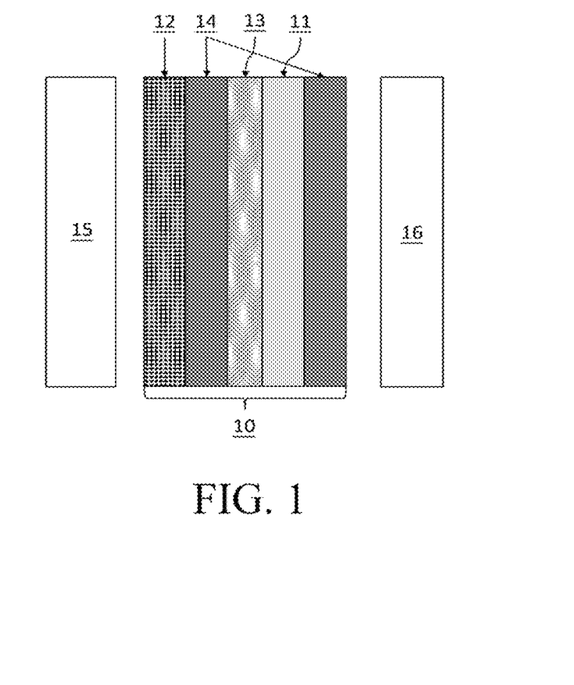
FIG. 1 is a structural schematic view of a first form of the composite separator disposed in an electrode assembly according to some embodiments of the present application.

FIG. 1 is a structural schematic view of the first form of the composite separator disposed in an electrode assembly according to some embodiments of the present application.

As shown in FIG. 1, the first form of a composite separator 10 comprises: a first porous substrate 11 and a cation exchange layer 12, wherein the cation exchange layer 12 comprises a second porous substrate grafted with a functional group, wherein the functional group is selected from the group consisting of an alkali-metal-sulfonic functional group, an alkali-metal-phosphoric functional group and a combination thereof. Further, the composite separator 10 further comprises a first coating 13 (anti-oxidation layer) and two second coatings 14 (binding layers), wherein the first coating 13 comprises inorganic particles and a binder and the second coating 14 comprises a polymer binder. The first coating 13 is disposed between the first porous substrate 11 and the cation exchange layer 12, and the second coatings 14 are respectively disposed between the first coating 13 and the cation exchange layer 12 and on the surface of the other side, opposite the cation exchange layer, of the first porous substrate 11.

In other embodiments, the first coating 13 may also be disposed on the surface of the other side, opposite the cation exchange layer 12, of the first porous substrate 11, for example, disposed between the first porous substrate 11 and the second coating 14 or disposed on the surface, facing an anode 16, of the second coating 14. In other embodiments, the composite separator 10 may also comprise more than two first coatings 13, wherein at least one of the first coatings 13 is disposed at a position as shown in FIG. 1, and at least another first coating 13 is disposed between the first porous substrate 11 and the second coating 14 or disposed on the surface, facing the anode 16, of the second coating 14.

Figure 2:
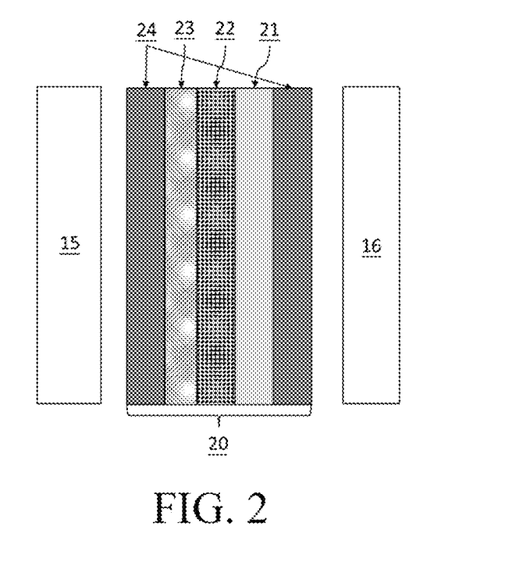
FIG. 2 is a structural schematic view of a second form of the composite separator disposed in an electrode assembly according to some embodiments of the present application.

FIG. 2 is a structural schematic view of the second form of the composite separator disposed in an electrode assembly according to some embodiments of the present application.

As shown in FIG. 2, the second form of the composite separator 20 comprises a first porous substrate 21 and a cation exchange layer 22, wherein the cation exchange layer 22 comprises a second porous substrate grafted with a functional group, wherein the functional group is selected from the group consisting of an alkali-metal-sulfonic functional group, an alkali-metal-phosphoric functional group and a combination thereof. Further, the composite separator 10 further comprises a first coating 23 (anti-oxidation layer) and two second coatings 24 (binding layers), wherein the first coating 23 comprises inorganic particles and a binder and the second coating 24 comprises a polymer binder. Compared with the first form of the composite separator 10, the cation exchange layer 22 of the composite separator 20 is disposed between the first porous substrate 21 and the first coating 23, wherein the second coatings 24 are respectively disposed on the surface of the other side, opposite the cation exchange layer 22, of the first coating 23 and the surface of the other side, opposite the cation exchange layer, of the first porous substrate 21.

In other embodiments, the first coating 23 may also be disposed on the surface of the other side, opposite the cation exchange layer, of the first porous substrate 21, for example, disposed between the first porous substrate 21 and the second coating 24 or disposed on the surface, facing the anode 16, of the second coating 24. In other embodiments, the composite separator 20 may also comprise more than two first coatings 23, wherein at least one of the first coatings 23 is disposed at a position as shown in FIG. 2, and at least another first coating 23 is disposed between the first porous substrate 21 and the second coating 24 or disposed on the surface, facing the anode 16, of the second coating 24.

Figure 3:
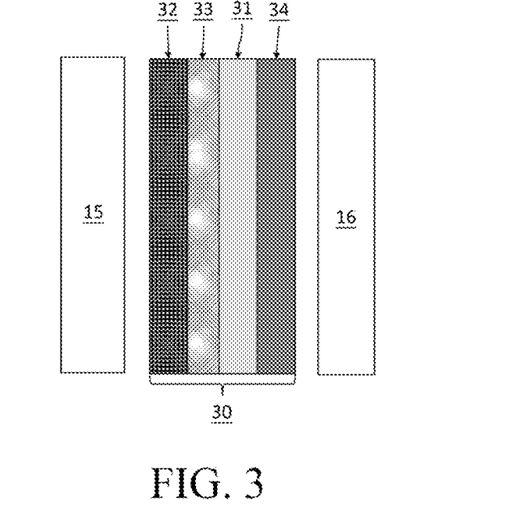
FIG. 3 is a structural schematic view of a third form of the composite separator disposed in an electrode assembly according to some embodiments of the present application.

FIG. 3 is a structural schematic view of the third form of the composite separator disposed in an electrode assembly according to some embodiments of the present application.

As shown in FIG. 3, the third form of the composite separator 30 comprises a first porous substrate 31 and a cation exchange layer 32, wherein the cation exchange layer 32 comprises a polymer binder grafted with a functional group, wherein the functional group is selected from the group consisting of an alkali-metal-sulfonic functional group, an alkali-metal-phosphoric functional group and a combination thereof. Further, the composite separator 30 further comprises a first coating 33 (anti-oxidation layer) and a second coating 34 (binding layer), wherein the first coating 33 comprises inorganic particles and a binder and the second coating 34 comprises a polymer binder. Similar to the first form of the composite separator 10, the first coating 33 of the composite separator 30 is disposed between the first porous substrate 31 and the cation exchange layer 32, and the second coating 34 is disposed on the surface of the other side, opposite the cation exchange layer 32, of the first porous substrate 31.

In other embodiments, the first coating 33 may further be disposed on the surface of the other side, opposite the cation exchange layer 32, of the first porous substrate 31, for example, disposed between the first porous substrate 31 and the second coating 34 or disposed on the surface, facing the anode 16, of the second coating 34. In other embodiments, the composite separator 30 may also comprise more than two first coatings 33, wherein at least one of the first coatings 33 is disposed at a position as shown in FIG. 3, and at least another first coating 33 is disposed between the first porous substrate 31 and the second coating 34 or disposed on the surface, facing the anode 16, of the second coating 34.

In some embodiments, those skilled in the art can also select whether to dispose or remove the second coating (14, 24, 34) in the composite separator (10, 20, 30) according to specific needs without being limited by FIGS. 1-3.

In some embodiments, as shown in FIGS. 1-3, the cation exchange layer (12, 22, 32) in the composite separator (10, 20, 30) is disposed on the side adjacent the cathode 15. The transition metal ions eluted from the cathode 15 are captured by the cation exchange layer (12, 22, 32), thereby effectively increasing the transition metal capture rate of the separator in the electrochemical device and avoiding the safety risk of the transition metal ions passing through the separator to deposit dendrites on the anode.

In some embodiments, the thickness of the first porous substrate (11, 21, 31) is from about 1 µm to about 20 µm.

In some embodiments, the thickness of the cation exchange layer (12, 22, 32) is from about 0.5 µm to about 10 µm.

In some embodiments, the thickness of the first coating (13, 23, 33) is from about 0.5 µm to about 10 µm.

In some embodiments, the thickness of the second coating (14, 24, 34) is from about 0.5 µm to about 10 µm.

In the above embodiments, the functional group grafted in the cation exchange layer (12, 22 and 32) comprises at least one of an alkali-metal-sulfonic functional group and an alkali-metal-phosphoric functional group, wherein the alkali-metal-sulfonic functional group comprises at least one of a lithium sulfonate group (—$SO_3Li$), a sodium sulfonate group (—$SO_3Na$) and a potassium sulfonate group (—$SO_3K$), and the alkali-metal-phosphoric functional group comprises at least one of a lithium phosphate group (—$PO_3Li_2$), a sodium phosphate group (—$PO_3Na_2$) and a potassium phosphate group (—$PO_3K_2$). In some embodiments, the alkali-metal-sulfonic functional group is a lithium sulfonate group, and the alkali-metal-phosphoric functional group is a lithium phosphate group.

In some embodiments, the cations in the functional group grafted in the cation exchange layer (12, 22 and 32) may be lithium ions, and when the lithium ions are replaced by transition metal ions, they may become a lithium source in an electrolytic solution to further enhance the cycling capability of the electrochemical device.

In the above embodiments, the functional-group-grafted material layer (second porous substrate or polymer binder) in the cation exchange layer (12, 22 and 32) can each determine the degree of grafting of the functional group on the material layer and its ability to exchange transition metal ions by measuring a grafting concentration of the functional group thereof, wherein the grafting concentration of the functional group refers to the ratio of the number of moles of the functional group to the mass of the cation exchange layer.

In some embodiments, the grafting concentration of the functional group can be measured by acid-base titration, and the steps are as follows: first, a certain mass of cation exchange layer (not yet neutralized with alkali metal ions, only grafted with the sulfonic acid group (—$SO_3H$) or the phosphoric acid group (—$PO_3H_2$)) is weighed, then the cation exchange layer is dissolved in water, and phenolphthalein is used as an indicator and titrated with a sodium hydroxide (NaOH) solution to obtain the number of moles of the spent sodium hydroxide solution.

In some embodiments, when the functional group employed is a sulfonic acid group, the grafting concentration A of the functional group (sulfonic acid group) in the cation exchange layer can be calculated by the following formula:

$$\text{grafting concentration } A(\text{mmol/g})=(V \times N/m),$$

where V is the titration volume (L) of the sodium hydroxide, N is the molar concentration (mmol/L) of the sodium hydroxide solution, and m is the mass (g) of the cation exchange layer.

In some embodiments, when the functional group employed is a phosphoric acid group, the grafting concentration A of the functional group (phosphoric acid group) in the cation exchange layer can be calculated by the following formula:

$$\text{grafting concentration } A(\text{mmol/g})=(V \times N/(2 \times m)),$$

where V is the titration volume (L) of the sodium hydroxide, N is the molar concentration (mmol/L) of the sodium hydroxide solution, and m is the mass (g) of the cation exchange layer.

In some embodiments, the grafting concentration of the functional-group-grafted material layer (second porous substrate or polymer binder) in the cation exchange layer (12, 22 and 32) is from about 0.15 mmol/g to about 0.95 mmol/g. In some embodiments, the grafting concentration of the functional groups can also be tested by other methods.

In some embodiments, the inorganic particles in the above embodiments can be selected from the group consisting of aluminum oxide, silicon dioxide, magnesium oxide, titanium oxide, hafnium oxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, barium sulfate and combinations thereof.

In some embodiments, the binder in the above embodiments can be selected from the group consisting of a vinylidene fluoride-hexafluoropropylene copolymer, a vinylidene fluoride-trichloroethylene copolymer, polyacrylate ester, polyacrylic acid, polyacrylate salt, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose sodium, carboxymethyl cellulose lithium, an acrylonitrile-styrene-butadiene copolymer, polyvinyl alcohol, polyvinyl ether, polytetrafluoroethylene, polyhexafluoropropylene, a styrene-butadiene copolymer, polyvinylidene fluoride and combinations thereof.

In some embodiments, the polymer binder in the above embodiments can be selected from the group consisting of a vinylidene fluoride-hexafluoropropylene copolymer, a vinylidene fluoride-trichloroethylene copolymer, polyacrylate ester, polyacrylic acid, polymethyl methacrylate, polyvinylidene fluoride, polyacrylonitrile, polytetrafluoroethylene, polyhexafluoropropylene, a styrene-butadiene copolymer and combinations thereof. The polymer binder may be in the form of granules, fibers, meshes, or other forms, having a strong binding force and capable of binding the electrode in contact therewith.

In some embodiments, the first porous substrate in the above embodiments is a polymer film, a multilayer polymer film or a nonwoven fabric formed of any one or a mixture of more than two of the following polymers: polyethylene, polypropylene, polyethylene terephthalate, polybutylene terephthalate, poly(p-phenylene terephthamide), polyester, polyacetal, polyamide, polycarbonate, polyimide, polyetheretherketone, polyaryletherketone, polyetherimide, polyamideimide, polybenzimidazole, polyethersulfone, polyphenylene oxide, cycloolefin copolymer, polyphenylene sulfide and poly(vinyl-naphthalene).

In some embodiments, the second porous substrate in the above embodiments is selected from the group consisting of polyethylene, polypropylene, polyethylene terephthalate, polyimide, an ethylene-styrene copolymer, polysulfone, polyetheretherketone, polystyrene and combinations thereof. The second porous substrate can function to insulate electrons and conduct lithium ions, but has no binding property.

In some embodiments, the preparation method of the first form of the composite separator comprises the following steps:

Inorganic particles and a binder are mixed and dissolved in a dilution solvent to form a first coating slurry (anti-oxidation layer), and then the first coating slurry is uniformly coated on one or both surfaces of the first porous substrate by microgravure coating. After drying, a double-layer or three-layer structure of the first coating and the first porous substrate is obtained. A polymer binder and an auxiliary binder are mixed and dissolved in a dilution solvent to form a second coating slurry (binding layer), and then the second coating slurry is uniformly coated on one or both surfaces of the double-layer or three-layer structure by microgravure coating. After drying, the first porous substrate, the first coating and the second coating in a multilayer composite structure are obtained.

A second porous substrate material is dissolved in a non-aqueous solvent. At least one of a vulcanizing agent and a phosphating agent is added into it, wherein the ratio of at least one of the vulcanizing agent and the phosphating agent to the second porous substrate material is from about 1 mL/g to about 50 mL/g. The mixture is functionalized at a temperature of about 20° C. to about 100° C. for about 0.5 h to 20 h. After that, a lithium hydroxide solution is added into the mixture, wherein the temperature is adjusted to about 45° C. After stirring, the deposit is taken out and dried to obtain a functional-group-grafted second porous substrate material; and the functional-group-grafted second porous substrate material and a binder are dissolved in a dilution solvent to form a cation exchange layer slurry. Then, the cation exchange layer slurry is uniformly coated on the side surface, adjacent the first coating, of the multilayer composite structure by microgravure coating. After drying and cutting, the first form of the composite separator is obtained.

In some embodiments, the preparation method of the second form of the composite separator comprises the following steps:

A second porous substrate material is dissolved in a non-aqueous solvent. At least one of a vulcanizing agent and a phosphating agent is added into it, wherein the ratio of at least one of the vulcanizing agent and the phosphating agent to the second porous substrate material is from about 1 mL/g to about 50 mL/g. The mixture is functionalized at a temperature of about 20° C. to about 100° C. for about 0.5 h to 20 h. After that, a lithium hydroxide solution is added into the mixture, wherein the temperature is adjusted to about 45° C. After stirring, the deposit is taken out and dried to obtain a functional-group-grafted second porous substrate material; and the functional-group-grafted second porous substrate material and a binder are dissolved in a dilution solvent to form a cation exchange layer slurry. Then, the cation exchange layer slurry is uniformly coated on one surface of the first porous substrate by microgravure coating. After drying, a double-layer structure of the cation exchange layer and the first porous substrate is obtained.

Inorganic particles and a binder are mixed and dissolved in a dilution solvent to form a first coating slurry (anti-oxidation layer). The first coating slurry is uniformly coated on one side surface of the cation exchange layer of the double-layer structure or both side surfaces of the double-layer structure of the double-layer structure by microgravure coating. After drying, a composite structure of the first coating and the double-layer structure is obtained. A polymer binder and an auxiliary binder are mixed and dissolved in a dilution solvent to form a second coating slurry (binding layer). And then, the second coating slurry is uniformly coated on one or both surfaces of the composite structure by microgravure coating. After drying and cutting, the second form of the composite separator is obtained.

In some embodiments, the preparation method of the third form of the composite separator comprises the following steps:

Inorganic particles and a binder are mixed and dissolved in a dilution solvent to form a first coating slurry (anti-oxidation layer). Then, the first coating slurry is uniformly coated on one or both surfaces of the first porous substrate by microgravure coating. After drying, a double-layer or three-layer structure of the first coating and the first porous substrate is obtained.

A polymer binder is dissolved in a non-aqueous solvent. At least one of a vulcanizing agent and a phosphating agent is added into it, wherein the ratio of at least one of the vulcanizing agent and the phosphating agent to the second porous substrate material is from about 1 mL/g to about 50 mL/g. The mixture is functionalized at a temperature of about 20° C. to about 100° C. for about 0.5 h to 20 h. A lithium hydroxide solution is added into the mixture, wherein the temperature is adjusted to about 45° C. After stirring, the deposit is taken out and dried to obtain a functional-group-grafted polymer binder material, and. the functional-group-grafted polymer binder material and an auxiliary binder are dissolved in a dilution solvent to form a cation exchange layer slurry. And then, the cation exchange layer slurry is uniformly coated on one side surface, adjacent the first coating, of the double-layer or three-layer structure by microgravure coating. A polymer binder and an auxiliary binder are mixed and dissolved in a dilution solvent to form a second coating slurry (binding layer). The second coating slurry is uniformly coated on one or both surfaces of the composite structure by microgravure coating. After drying and cutting, the third form of the composite separator is obtained.

The preparation method of the composite separator in the embodiments of the present application may be a conventional method in the art without being limited thereto.

Some embodiments of the present application further provide an electrochemical device comprising the composite separator of the present application. In some embodiments, the electrochemical device is a lithium-ion battery. The lithium-ion battery comprises a cathode, an anode, an electrolytic solution and a composite separator according to the present application, wherein the composite separator is disposed between the cathode and the anode. The cation exchange layer enhances the wetting and liquid retention capabilities of the electrode assembly in the electrochemical device, thereby enhancing the electrochemical stability and cycling performance of the electrochemical device.

In the above lithium-ion battery, the cathode comprises a cathode material capable of absorbing and releasing lithium (Li) (hereinafter, sometimes referred to as "a cathode material capable of absorbing/releasing lithium Li"). Examples of the cathode material capable of absorbing/releasing lithium (Li) may comprise one or more of lithium cobaltate, lithium nickel cobalt manganese oxide, lithium nickel cobalt aluminum oxide, lithium manganate, lithium manganese iron phosphate, lithium vanadium phosphate, oxy-lithium vanadium phosphate, lithium iron phosphate, lithium titanate and lithium-rich manganese-based material.

The anode comprises an anode material capable of absorbing and releasing lithium (Li) (hereinafter, sometimes referred to as "an anode material capable of absorbing/releasing lithium (Li)"). Examples of the anode material capable of absorbing/releasing lithium (Li) may comprise carbon materials, metal compounds, oxides, sulfides, nitrides of lithium such as $LiN_3$, lithium metal, metals forming alloys together with lithium, and polymer materials.

The lithium-ion battery of the present application further comprises an electrolyte, the electrolyte may be one or more of a gel electrolyte, a solid electrolyte and an electrolytic solution, and the electrolytic solution comprises a lithium salt and a non-aqueous solvent.

In some embodiments, the lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is $LiPF_6$ because it can provide high ionic conductivity and improve the cycling performance.

The non-aqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate and combinations thereof.

In some embodiments, the preparation method of the lithium-ion battery comprises: the cathode in the above embodiments, the separator of the present application and the anode are sequentially wound or stacked into an electrode assembly, then the electrode assembly is loaded into, for example, an aluminum plastic film, an electrolytic solution is injected, and then vacuum encapsulation, standing, formation, shaping and the like are performed to obtain the lithium-ion battery.

Although the lithium-ion battery is used as an example for the description above, after reading the present application, those skilled in the art will appreciate that the composite separator of the present application can be used in other suitable electrochemical devices. Such electrochemical devices comprise any device for electrochemical reaction, and specific examples thereof comprise all kinds of primary batteries, secondary batteries, fuel cells, solar cells or capacitors. In particular, the electrochemical device is a lithium secondary battery, comprising a lithium metal secondary battery, a lithium-ion secondary battery, a lithium polymer secondary battery or a lithium ion polymer secondary battery.

Some embodiments of the present application further provide an electronic device, comprising the electrochemical device in the embodiments of the present application.

The electronic device of the embodiments of the present application is not particularly limited, and may be any electronic device known in the art. In some embodiments, the electronic device may comprise, but is not limited to, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disk player, a transceiver, an electronic notebook, a calculator, a memory card, a portable recorder, a radio, a backup power, a motor, a car, a motorcycle, a power bicycle, a bicycle, a lighting fixture, a toy, a game console, a clock, an electric tool, a flash lamp, a camera, a large household battery, a lithium-ion capacitor and the like.

SPECIFIC EXAMPLES

Some specific examples and a comparative example are listed below, and the electrochemical device (i.e. lithium-ion battery) is subjected to a transition metal capture rate test, a self-discharge test, a nail penetration test and a cycling performance test, respectively, so as to better illustrate the technical solutions of the present application.

Preparation of Cathode

Aluminum foil was adopted as a cathode current collector. A layer of lithium cobaltate slurry (cathode material layer) was uniformly coated on the surface of the cathode current collector, wherein the lithium cobaltate slurry is composed of 94 wt % of lithium cobaltate, 3 wt % of polyvinylidene fluoride and 3 wt % of acetylene black. Then, the cathode current collector coated with the lithium cobaltate slurry was baked at 120° C. for 1 h, and was subjected to cold pressing, cutting and slitting to obtain the cathode.

Preparation of Anode

Copper foil was adopted as an anode current collector. A layer of graphite slurry (anode material layer) was uniformly coated on the surface of the anode current collector, wherein the graphite slurry is composed of 95 wt % of artificial graphite, 2 wt % of acetylene black, 2 wt % of styrene-butadiene rubber and 1 wt % of carboxymethyl cellulose sodium. Then, the anode current collector coated with the graphite slurry was baked at 120° C. for 1 h, and was subjected to cold pressing, cutting and slitting to obtain the anode.

Preparation of Electrolytic Solution

In an environment with a water content of less than 10 ppm, lithium hexafluorophosphate and a non-aqueous organic solvent (ethylene carbonate (EC):propylene carbonate (PC):diethyl carbonate (DEC)=1:1:1, mass ratio) were formulated according to a mass ratio of 8:92 to form the electrolytic solution.

Preparation of Lithium-Ion Battery

The composite separator in the embodiments and comparative example was prepared into a lithium-ion battery by the following preparation methods. Specifically, the composite separators prepared in the following embodiments and comparative example were sequentially stacked in accordance with the above cathode, the composite separators and the above anode, wherein the side, having the cation exchange layer, of the composite separator faced the cathode and the side, farther away from the cation exchange layer, faced the anode such that the separator was disposed between the cathode and the anode to perform a separation function, and then, they were wound into an electrode assembly. Then, the electrode assembly was placed in an aluminum foil packaging bag, and dehydrated at 80° C. to obtain a dry electrode assembly. The above electrolytic solution was injected into the dry electrode assembly, and subjected to vacuum encapsulation, standing, formation, shaping and the like, thereby completing the preparation of the lithium-ion batteries of the following embodiments and comparative example.

Example 1

Aluminum oxide and polyacrylate ester were mixed according to a mass ratio of 90:10 and dissolved in deionized water to form a first coating slurry (anti-oxidation layer), wherein the solid content of the first coating slurry was 45 wt %. The first coating slurry was uniformly coated on one surface of a polyethylene porous substrate at a thickness of 7 μm by microgravure coating. After drying, a double-layer structure of the first coating and the polyethylene substrate was obtained, wherein the thickness of the first coating was 2 μm. Polyvinylidene fluoride and polyacrylate ester were mixed according to a mass ratio of 3:2 and dissolved in deionized water to form a second coating slurry (binding layer), wherein the solid content of the second coating slurry was 30 wt %. The second coating slurry was uniformly coated on both side surfaces of the double-layer structure of the first coating and the polyethylene porous substrate by microgravure coating. After drying, the first porous substrate, the first coating and the second coating in a multilayer composite structure was obtained, wherein the single side thickness of the second coating was 1 μm.

Polyethylene particles were dissolved in 1,2-dichloroethane to form a solution having a solid content of 30 wt %. Concentrated sulfuric acid was added to the solution, wherein the ratio of concentrated sulfuric acid to polyethylene particles was 3.0 mL/g, and the mixture was functionalized at a temperature of 60° C. for 4 h. A lithium hydroxide solution having the concentration of 2 mol/L was added such that the molar ratio of lithium hydroxide to concentrated sulfuric acid was 2.4:1, then the temperature was adjusted to about 45° C. After stirring for 1 h, the deposit was taken out and dried to obtain a functional-group-grafted polyethylene material. The functional-group-grafted polyethylene material and polyacrylate ester were mixed according to a mass ratio of 3:2 and dissolved in deionized water to form a cation exchange layer slurry, wherein the solid content of the cation exchange layer was 30 wt %. The cation exchange layer slurry was uniformly coated on a side surface, adjacent the first coating, of the multilayer composite structure by microgravure coating to form a cation exchange layer, wherein the thickness of the cation exchange layer was 3 μm. After drying and cutting, the first form of the composite separator was obtained.

Example 2

Polyethylene particles were dissolved in 1,2-dichloroethane to form a solution having a solid content of 30 wt %. Concentrated sulfuric acid was added to the solution, wherein the ratio of concentrated sulfuric acid to polyethylene particles was 3.0 mL/g, and the mixture was functionalized at a temperature of 60° C. for 4 h. A lithium hydroxide solution having the concentration of 2 mol/L was added such that the molar ratio of lithium hydroxide to concentrated sulfuric acid was 2.4:1, wherein the temperature was adjusted to 45° C. After stirring for 1 h, the deposit was taken out and dried to obtain a functional-group-grafted polyethylene material. The functional-group-grafted polyethylene material and polyacrylate ester were mixed according to a mass ratio of 3:2 and dissolved in deionized water to form a cation exchange layer slurry, wherein the solid content of the cation exchange layer was 30 wt %. The cation exchange layer slurry was uniformly coated on one surface of a polyethylene porous substrate at a thickness of 7 μm by microgravure coating, wherein the thickness of the cation exchange layer was 3 μm. After drying, a double-layer structure of the cation exchange layer and the polyethylene porous substrate was obtained.

Aluminum oxide and polyacrylate ester were mixed according to a mass ratio of 90:10 and dissolved in deionized water to form a first coating slurry (anti-oxidation layer), wherein the solid content of the first coating slurry was 45 wt %. The first coating slurry was uniformly coated on one side surface of the cation exchange layer of the double-layer structure by microgravure coating. After drying, a composite structure of the first coating and the double-layer structure was obtained, wherein the thickness of the first coating was 2 μm. Polyvinylidene fluoride and polyacrylate ester were mixed according to a mass ratio of 3:2 and dissolved in deionized water to form a second coating slurry (binding layer), wherein the solid content of the second coating slurry was 30 wt %. The second coating slurry was uniformly coated on both side surfaces of the composite structure by microgravure coating, wherein the single side thickness of the second coating was 1 μm. After drying and cutting, the second form of the composite separator was obtained.

Example 3

Aluminum oxide and polyacrylate ester were mixed according to a mass ratio of 90:10 and dissolved in deionized water to form a first coating slurry (anti-oxidation layer), wherein a solid content of the first coating slurry was 45 wt %. The first coating slurry was uniformly coated on one surface of a polyethylene porous substrate at a thickness of 7 μm by microgravure coating. After drying, a double-layer structure of the first coating and the polyethylene porous substrate was obtained, wherein the thickness of the first coating was 2 μm.

Polyvinylidene fluoride was dissolved in 1,2-dichloroethane to form a solution having the solid content of 30 wt %. Concentrated sulfuric acid was added to the solution, wherein the ratio of concentrated sulfuric acid to polyvinylidene fluoride was 3.0 mL/g, and the mixture was functionalized at a temperature of 60° C. for 4 h. A lithium hydroxide solution having the concentration of 2 mol/L was added such that the molar ratio of lithium hydroxide to concentrated sulfuric acid was 2.4:1, wherein the temperature was adjusted to about 45° C. After stirring for 1 h, the deposit was taken out and dried to obtain a functional-group-grafted polyvinylidene fluoride material. The functional-group-grafted polyvinylidene fluoride material and polyacrylate ester were mixed according to a mass ratio of 3:2 and dissolved in deionized water to form a functional-group-grafted polymer binder slurry (binding layer), wherein the solid content of the functional-group-grafted polymer binder slurry was 30 wt %. The functional-group-grafted polymer binder slurry was uniformly coated on one side surface of the first coating of the double-layer structure of the first coating and the polyethylene substrate by microgravure coating to form a cation exchange layer. The same second coating slurry as in Examples 1 and 2 was coated on the other side surface of the double-layer structure to form a second coating, wherein the thickness of the cation exchange layer was 3 μm and the thickness of the second coating was 1 μm, and after drying and cutting, the third form of the composite separator was obtained.

Example 4

The preparation method is the same as that of Example 3. The difference is that in Example 4, concentrated phosphoric acid ($H_2PO_3$) was added to the solution of polyvinylidene fluoride and 1,2-dichloroethane, wherein the ratio of concentrated phosphoric acid to polyvinylidene fluoride was 3.0 mL/g; the mixture was functionalized at a temperature of 60° C. for 4 h; and a lithium hydroxide solution having the concentration of 2 mol/L was added such that the molar ratio of lithium hydroxide to concentrated phosphoric acid was 2.4:1.

Example 5

The preparation method is the same as that of Example 3. The difference is that in Example 5, the thickness of the cation exchange layer was 1 μm.

Example 6

The preparation method is the same as that of Example 3. The difference is that in Example 6, the thickness of the cation exchange layer was 5 μm.

Example 7

The preparation method is the same as that of Example 3. The difference is that in Example 7, the thickness of the cation exchange layer was 8 μm.

Example 8

The preparation method is the same as that of Example 3. The difference is that in Example 8, the ratio of concentrated sulfuric acid to polyvinylidene fluoride was 1.0 mL/g.

Example 9

The preparation method is the same as that of Example 3. The difference is that in Example 9, the ratio of concentrated sulfuric acid to polyvinylidene fluoride was 5.0 mL/g.

Example 10

The preparation method is the same as that of Example 3. The difference is that in Example 10, the ratio of concentrated sulfuric acid to polyvinylidene fluoride was 8.0 mL/g.

Example 11

The preparation method is the same as that of Example 3. The difference is that in Example 11, the mixture was functionalized at a temperature of 20° C. for 4 h.

Example 12

The preparation method is the same as that of Example 3. The difference is that in Example 12, the mixture was functionalized at a temperature of 40° C. for 4 h.

Example 13

The preparation method is the same as that of Example 3. The difference is that in Example 13, the mixture was functionalized at a temperature of 80° C. for 4 h.

Example 14

The preparation method is the same as that of Example 3. The difference is that in Example 14, the mixture was functionalized at a temperature of 60° C. for 2 h.

Example 15

The preparation method is the same as that of Example 3. The difference is that in Example 15, the mixture was functionalized at a temperature of 60° C. for 6 h.

Example 16

The preparation method is the same as that of Example 1. The difference is that in Example 16, the mixture was functionalized at a temperature of 60° C. for 8 h.

Example 17

The preparation method is the same as that of Example 3. The difference is that in Example 17, the thickness of the cation exchange layer was 0.5 µm.

Example 18

The preparation method is the same as that of Example 3. The difference is that in Example 18, the thickness of the cation exchange layer was 15 µm.

Example 19

The preparation method is the same as that of Example 3. The difference is that in Example 19, the ratio of concentrated sulfuric acid to polyvinylidene fluoride was 0.5 mL/g.

Comparative Example 1

Aluminum oxide and polyacrylate ester were mixed according to a mass ratio of 90:10 and dissolved in deionized water to form a first coating slurry (anti-oxidation layer), wherein the solid content of the first coating slurry was 45 wt %. The first coating slurry was uniformly coated on one surface of a polyethylene porous substrate at a thickness of 7 µm by microgravure coating. After drying, a double-layer structure of the first coating and the polyethylene substrate was obtained, wherein the thickness of the first coating was 2 µm. Polyvinylidene fluoride and polyacrylate ester were mixed according to a mass ratio of 3:2 and dissolved in deionized water to form a second coating slurry (binding layer), wherein the solid content of the second coating slurry was 30 wt %. The second coating slurry was uniformly coated on both surfaces of the double-layer structure of the first coating and the polyethylene porous substrate by microgravure coating. After drying, the first porous substrate, the first coating and the second coating in a multilayer composite structure was obtained, wherein the single side thickness of the second coating was 1 µm.

For the composite separators of the above examples and comparative example, the grafting concentration of the cation exchange layer thereof was measured. After the lithium-ion battery was fabricated, battery capacity, thickness, width and length were recorded to determine the volumetric energy density of the lithium-ion battery. Then the lithium-ion battery was subjected to a cycling performance test, a metal capture rate test, a self-discharge test and a nail penetration test.

Cycling Performance Test

The lithium-ion battery of the following examples and comparative example was in an incubator at 25° C.±2° C., charged at a constant current of 0.7 C to 4.4 V, then charged at a constant voltage of 4.4 V to 0.05 C, and finally discharged at a constant current of 0.5 C to 3.0 V, which was a charge and discharge cycle, and the discharge capacity after the first cycle of the lithium-ion battery was recorded. Then, the charge and discharge cycle was performed 300 times as described above, and the discharge capacity of after the 300th cycle of the lithium-ion battery was recorded. 5 lithium-ion batteries were used for each group to calculate the average of the capacity retention rates of the lithium-ion batteries. Capacity retention rate of lithium-ion battery=discharge capacity (mAh) after the 300th cycle/discharge capacity (mAh) after the first cycle×100%.

Transition Metal Capture Rate Test

The definition of the transition metal capture rate is as follows:

Transition metal capture rate $\gamma=1-$(transition metal deposition amount of anode/transition metal loss amount of cathode)

The test was performed by an inductive coupled plasma emission spectrometer (ICP) to obtain the amount of transition metal deposition on the anode and the transition metal loss amount of the cathode of the lithium-ion battery. The specific steps are as follows:

The uncycled lithium-ion battery was discharged to a range of 2.5 V to 3.0 V, and then disassembled to take out the anode and the cathode, the anode and the cathode were immersed in dimethyl carbonate for 2 h, and the immersed anode and cathode were air dried. The anode and the cathode were respectively loaded into a mold of 1540.25 mm$^2$, and then the inductive coupled plasma emission spectrometer was used to obtain the amount of transition metal deposition on the anode of the uncycled lithium-ion battery and the transition metal loss amount of the cathode of the uncycled lithium-ion battery.

The lithium-ion battery subjected to the 300-cycle test was discharged to a range of 2.5 V to 3.0 V, and then disassembled to take out the anode and the cathode, the anode and the cathode were immersed in dimethyl carbonate for 2 h, and the immersed anode and cathode were naturally dried. The anode and the cathode were respectively loaded into a 1540.25 mm² mold, and then an inductive coupled plasma emission spectrometer was used to obtain the amount of transition metal deposition on the anode of the lithium-ion battery subjected to the 300-cycle test and the transition metal loss amount of the cathode of the lithium-ion battery subjected to the 300-cycle test.

5 lithium-ion batteries were used for each of the above two groups to calculate the average amount of transition metal deposition on the anode and the transition metal loss amount of the cathode of the lithium-ion battery, wherein the amount of transition metal deposition on the anode was the amount of transition metal deposition on the anode of the lithium-ion battery subjected to the 300-cycle test minus the amount of transition metal deposition on the anode of the uncycled lithium-ion battery, and the transition metal loss amount of the cathode was the transition metal loss amount of the cathode of the uncycled lithium-ion battery minus the transition metal loss amount of the cathode of the lithium-ion battery subjected to the 300-cycle test.

Self-Discharge Test

The lithium-ion battery was placed in a 25° C. incubator, charged at a constant current of 0.5 C to 4.4 V and then charged at a constant voltage to 0.05 C, where the initial voltage V1 of the lithium-ion battery was recorded. Then, the lithium-ion battery was kept at a constant voltage of 45° C. for 1000 h, where the final voltage V2 of the lithium-ion battery was determined. The self-discharge rate value was obtained according to the following formula:

self-discharge rate $k$ (mV/h)=($V1-V2$)/1000 (h),

Nail Penetration Test

The lithium-ion battery was placed in a 25° C. incubator and allowed to stand for 30 min to bring the lithium-ion battery to a constant temperature. The constant-temperature lithium-ion battery was charged at a constant current of 0.5 C to a voltage of 4.4 V, and then charged at a constant voltage of 4.4 V to a current of 0.025 C. The fully-charged lithium-ion battery was transferred to a nail penetration tester, the test environment temperature was kept at 25° C.±2° C., and a steel nail having the diameter of 4 mm was used to pass through the center of the lithium-ion battery at a uniform speed of 30 mm/s for 300 seconds. A lithium-ion battery not exhibiting smoking, igniting or exploding was recorded as a pass. Each time 10 lithium-ion batteries were tested, and the number of lithium-ion batteries that passed the nail penetration test was used as an indicator to evaluate the safety performance of the lithium-ion batteries.

The specific implementation parameters of Examples 1-19 and Comparative Example 1 above and their grafting concentration results are shown in Table 1 below.

TABLE 1

| Example/ Comparative Example | Form of Composite Separator | Functional Group | Thickness of Cation Exchange Layer (μm) | Vulcanizing/ Phosphating Agent to Grafted Substance Ratio (mL/g) | Vulcanizing/ Phosphating Temperature (° C.) | Vulcanizing/ Phosphating Time (h) | Grafting Concentration (mmol/g) |
|---|---|---|---|---|---|---|---|
| Example 1 | First form | —SO₃Li | 3 | 3.0 | 60 | 4 | 0.63 |
| Example 2 | Second form | —SO₃Li | 3 | 3.0 | 60 | 4 | 0.63 |
| Example 3 | Third form | —SO₃Li | 3 | 3.0 | 60 | 4 | 0.50 |
| Example 4 | Third form | —PO₃Li₂ | 3 | 3.0 | 60 | 4 | 0.31 |
| Example 5 | Third form | —SO₃Li | 1 | 3.0 | 60 | 4 | 0.63 |
| Example 6 | Third form | —SO₃Li | 5 | 3.0 | 60 | 4 | 0.63 |
| Example 7 | Third form | —SO₃Li | 8 | 3.0 | 60 | 4 | 0.63 |
| Example 8 | Third form | —SO₃Li | 3 | 1.0 | 60 | 4 | 0.37 |
| Example 9 | Third form | —SO₃Li | 3 | 5.0 | 60 | 4 | 0.57 |
| Example 10 | Third form | —SO₃Li | 3 | 8.0 | 60 | 4 | 0.61 |
| Example 11 | Third form | —SO₃Li | 3 | 3.0 | 20 | 4 | 0.13 |
| Example 12 | Third form | —SO₃Li | 3 | 3.0 | 40 | 4 | 0.32 |
| Example 13 | Third form | —SO₃Li | 3 | 3.0 | 80 | 4 | 0.73 |
| Example 14 | Third form | —SO₃Li | 3 | 3.0 | 60 | 2 | 0.28 |
| Example 15 | Third form | —SO₃Li | 3 | 3.0 | 60 | 6 | 0.73 |
| Example 16 | Third form | —SO₃Li | 3 | 3.0 | 60 | 8 | 0.76 |
| Example 17 | Third form | —SO₃Li | 0.5 | 3.0 | 60 | 4 | 0.63 |
| Example 18 | Third form | —SO₃Li | 15 | 3.0 | 60 | 4 | 0.91 |
| Example 19 | Third form | —SO₃Li | 3 | 0.5 | 60 | 4 | 0.09 |
| Comparative Example 1 | / | / | / | / | / | / | 0.0 |

The results of the transition metal capture rate test, the self-discharge test, the nail penetration test and the cycling performance test of the electrochemical devices of Examples 1-19 and Comparative Example 1 are shown in Table 2 below.

TABLE 2

| Example/ Comparative Example | Transition Metal Capture Rate γ | Self-discharge Rate k (mV/h) | Nail Penetration Test Pass Rate | Capacity Retention Rate |
|---|---|---|---|---|
| Example 1 | 0.63 | 0.04 | 10/10 | 93.5% |
| Example 2 | 0.71 | 0.03 | 10/10 | 93.3% |
| Example 3 | 0.74 | 0.03 | 10/10 | 93.2% |
| Example 4 | 0.66 | 0.05 | 9/10 | 92.2% |
| Example 5 | 0.62 | 0.05 | 8/10 | 92.1% |
| Example 6 | 0.93 | 0.02 | 10/10 | 93.9% |
| Example 7 | 0.97 | 0.02 | 10/10 | 93.8% |
| Example 8 | 0.64 | 0.05 | 8/10 | 92.2% |
| Example 9 | 0.84 | 0.03 | 10/10 | 93.1% |
| Example 10 | 0.90 | 0.02 | 10/10 | 93.7% |
| Example 11 | 0.61 | 0.05 | 8/10 | 92.7% |
| Example 12 | 0.73 | 0.03 | 10/10 | 93.3% |
| Example 13 | 0.97 | 0.02 | 10/10 | 93.7% |
| Example 14 | 0.72 | 0.03 | 10/10 | 92.1% |
| Example 15 | 0.95 | 0.02 | 10/10 | 93.7% |
| Example 16 | 0.96 | 0.02 | 10/10 | 93.5% |
| Example 17 | 0.43 | 0.08 | 6/10 | 90.3% |
| Example 18 | 0.98 | 0.02 | 10/10 | 78.6% |

TABLE 2-continued

| Example/<br>Comparative<br>Example | Transition<br>Metal<br>Capture<br>Rate γ | Self-<br>discharge<br>Rate k<br>(mV/h) | Nail<br>Penetration<br>Test Pass<br>Rate | Capacity<br>Retention<br>Rate |
|---|---|---|---|---|
| Example 19 | 0.47 | 0.08 | 8/10 | 91.6% |
| Comparative Example 1 | 0.26 | 0.17 | 5/10 | 89.7% |

It can be seen from Table 2 that as compared with Comparative Example 1, the electrochemical device having the composite separator of the embodiments of the present application has a significant enhancement in safety performance and cycling performance. Specifically, when Comparative Example 1 is compared with Examples 1-19, it can be known that the electrochemical device having the composite separator of the embodiments of the present application can effectively increase the transition metal capture rate of the separator and reduce the self-discharge rate in the transition metal capture rate test and the self-discharge test. This represents that the composite separator of the present application can effectively capture transition metal ions with lower electrical conductivity, thereby improving the self-discharge rate of the electrochemical device. In addition, compared with Comparative Example 1, the electrochemical device having the composite separator in Examples 1-19 of the present application also exhibits excellent results in the nail penetration test or the cycling performance test, thereby effectively improving the safety performance and cycling performance of the electrochemical device.

It can be seen from Table 1 and Table 2 that the first, second and third forms of the composite separators provided in Examples 1-3 of the present application can achieve a nail penetration success rate of 10/10, a self-discharge rate of less than 0.04 and a capacity retention rate of 93.2% and above.

The electrochemical device of Example 4 of the present application also exhibited an excellent nail penetration success rate, a self-discharge rate of 0.05 and a capacity retention rate of 92.2%. It can be seen that the cation exchange layer using a lithium phosphate group as a functional group can also improve the transition metal ion deposition of the electrochemical device, thereby enhancing its safety performance and cycling performance.

When Examples 5-7, 17 and 18 are compared, it can be seen that when the thickness of the cation exchange layer in the composite separator of the present application is in the range of 0.5 μm to 10 μm, the electrochemical device can maintain excellent safety performance and cycling performance.

According to different specific implementation parameters in the manufacturing process, the grafting concentration of the functional group on the cation exchange layer in the composite separator of the present application is affected by the ratio of the vulcanizing/phosphating agent to the substrate, the operating temperature of the vulcanizing/phosphating process and the operating time of the vulcanizing/phosphating process, thereby affecting the transition metal ion capture capability of the cation exchange layer.

When Examples 8-10 and 19 are compared, it can be seen that when the ratio of the vulcanizing/phosphating agent to the substrate is in the range of the embodiments of the present application, the grafting concentration of the functional group on the cation exchange layer can be maintained at a certain value to maintain the transition metal ion capture capability, thereby increasing the transition metal capture rate of the separator in the electrochemical device.

Similarly, when Examples 11-16 are compared, it can be seen that when the time or the reaction temperature during the functionalization is in the range of the embodiments of the present application, the grafting concentration of the functional group on the cation exchange layer can be maintained at a certain value to maintain the transition metal ion capture capability, thereby increasing the transition metal capture rate of the separator in the electrochemical device.

In addition, the embodiments of the present application may further combine a scanning electron microscope (SEM) and an energy dispersive spectrometer (EDS) to illustrate the transition metal ion capture capability of the composite separator of the present application.

Figure 4:
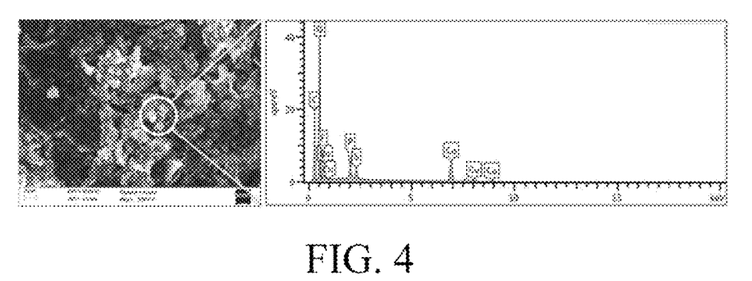
FIG. 4 is an enlarged view of an anode of Comparative Example 1 of the present application after passing a self-discharge test under an electron microscope and an energy distribution diagram of an energy spectrometer.
Figure 5:
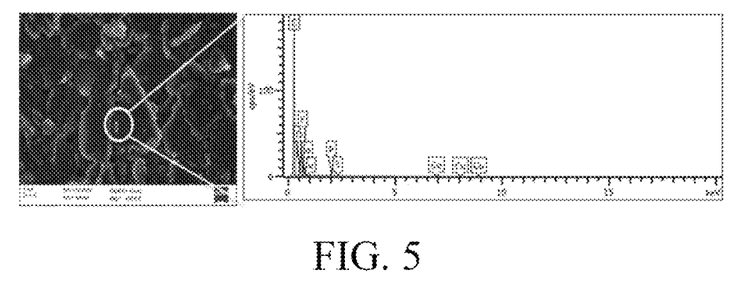
FIG. 5 is an enlarged view of an anode of Example 1 of the present application after passing a self-discharge test under an electron microscope and an energy distribution diagram of an energy spectrometer.

FIG. 4 and FIG. 5 are respectively 3000-fold enlarged views of the anodes of Comparative Example 1 and Example 1 of the present application after passing the self-discharge test under a scanning electron microscope (Zeiss, SIGMA) and energy distribution diagrams of an energy dispersive spectrometer (X-max. EDS).

As shown in FIG. 5, after the anode in the electrochemical device of Example 1 of the present application passed the 1000 h constant voltage test, the SEM enlarged view has no obvious deposition of transition metals aside from the original anode active material particles. In addition, the EDS spectrum thereof also shows that the anode in the electrochemical device of the present application has no other significant transition metal peaks other than graphite. In contrast, as shown in FIG. 4, the anode in the electrochemical device of Comparative Example 1 showed significant transition metal deposition on the SEM enlarged view after passing the 1000 h constant voltage test, and its EDS spectrum also shows that there is a distinct peak in the ranges of O atoms and Co metals, which represents the formation of metal oxides.

Figure 6:
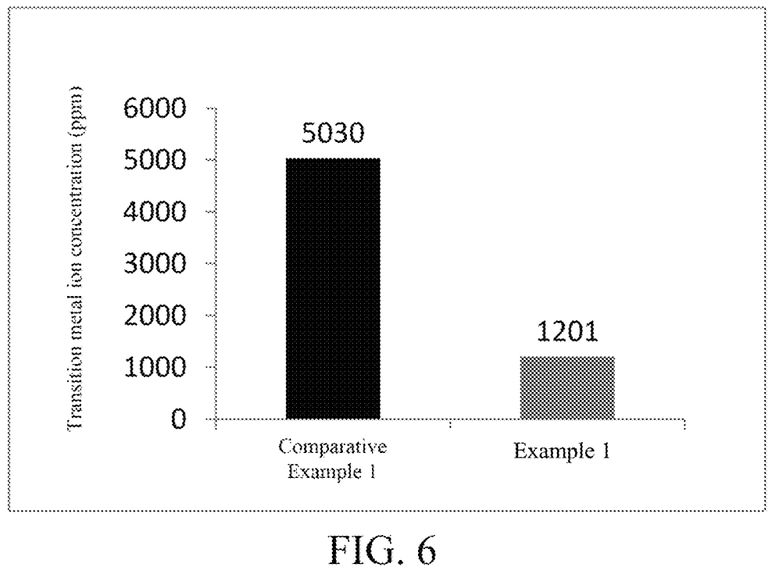
FIG. 6 is a graph showing the amount of transition metal deposition on an anode of a lithium-ion battery of Example 1 and Comparative Example 1 after passing a cycle test.

At the same time, the quantitative comparison of the amount of transition metal deposition on the anode of Comparative Example 1 and Example 1 of the present application can be further made by an ICP. FIG. 6 is a graph showing the amount of transition metal deposition on the anodes of the lithium-ion battery of Example 1 and Comparative Example 1 after passing the cycle test.

As shown in FIG. 6, the concentration of transition metal deposition on the anode of Example 1 of the present application is only 1,210 ppm, whereas the concentration of transition metal deposition on the anode of Comparative Example 1 can reach 5030 ppm. It can be seen that the electrochemical device using the composite separator of the present application can effectively reduce transition metal deposition on the anode and reduce the effect of its deposition to ¼ of that of the electrochemical device not using the composite separator of the present application.

Through the comparison of the above Examples and Comparative Example, it can be clearly understood that the composite separator of the present application can effectively capture the transition metal ions eluted from the cathode through the cation exchange layer, thereby reducing the deposition of transition metal ions on the anode and the self-discharge rate of the lithium-ion battery. Therefore, electrochemical stability and cycling performance of the electrochemical device are enhanced, and the safety of the electrochemical device is also significantly improved.

References throughout the specification of the present application to "embodiments", "partial embodiments," "an embodiment," "another example", "examples", "specific examples" or "partial examples" mean that at least one embodiment or example in the embodiments of the present application includes specific features, structures, materials or characteristics described in the embodiment or example. Therefore, descriptions appearing throughout the specification, such as "in some embodiments", "in the embodiments", "in an embodiment", "in another example", "in an example", in a particular example" or "examples", are not necessarily referring to the same embodiments or examples in the embodiments of the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. A composite separator, comprising:
   a first porous substrate;
   a first coating; and
   a cation exchange layer,
   wherein the first coating comprises inorganic particles and a binder, and the first coating is disposed between the first porous substrate and the cation exchange layer,
   wherein the cation exchange layer comprises a polymer binder grafted with a functional group,
   wherein the functional group is selected from the group consisting of an alkali-metal-sulfonic functional group, an alkali-metal-phosphoric functional group and a combination thereof.

2. The composite separator according to claim 1, further comprising a second coating, the second coating comprising a polymer binder.

3. The composite separator according to claim 2, wherein the first porous substrate is disposed between the first coating and the second coating.

4. The composite separator according to claim 2, wherein the first coating is disposed between the first porous substrate and the second coating.

5. The composite separator according to claim 1, wherein the polymer binder is selected from the group consisting of:
   a vinylidene fluoride-hexafluoropropylene copolymer,
   a vinylidene fluoride-trichloroethylene copolymer,
   polyacrylate ester,
   polyacrylic acid,
   polymethyl methacrylate,
   polyvinylidene fluoride,
   polyacrylonitrile,
   polytetrafluoroethylene,
   polyhexafluoropropylene,
   a styrene-butadiene copolymer,
   and combinations thereof.

6. The composite separator according to claim 1, wherein a grafting concentration of the functional group is from about 0.15 mmol/g to about 0.95 mmol/g, and the thickness of the cation exchange layer is from about 0.5 μm to about 10 μm.

7. An electrochemical device, comprising:
   a cathode;
   an anode; and
   a composite separator;
   wherein the composite separator comprises:
   a first porous substrate;
   a first coating; and
   a cation exchange layer,
   wherein the first coating comprises inorganic particles and a binder, and the first coating is disposed between the first porous substrate and the cation exchange layer,
   wherein the cation exchange layer comprises a polymer binder grafted with a functional group,
   wherein the functional group is selected from the group consisting of an alkali-metal-sulfonic functional group, an alkali-metal-phosphoric functional group and a combination thereof; and
   wherein the composite separator is disposed between the cathode and the anode.

8. The electrochemical device according to claim 7, wherein the composite separator further comprises a second coating, the second coating comprising a polymer binder.

9. The electrochemical device according to claim 8, wherein the first porous substrate is disposed between the first coating and the second coating.

10. The electrochemical device according to claim 8, wherein the first coating is disposed between the first porous substrate and the second coating.

11. The electrochemical device according to claim 7, wherein the polymer binder is selected from the group consisting of:
    a vinylidene fluoride-hexafluoropropylene copolymer,
    a vinylidene fluoride-trichloroethylene copolymer,
    polyacrylate ester,
    polyacrylic acid,
    polymethyl methacrylate, polyvinylidene fluoride,
    polyacrylonitrile,
    polytetrafluoroethylene,
    polyhexafluoropropylene,
    a styrene-butadiene copolymer,
    and combinations thereof.

12. The electrochemical device according to claim 7, wherein a grafting concentration of the functional group is from about 0.15 mmol/g to about 0.95 mmol/g, and the thickness of the cation exchange layer is from about 0.5 μm to about 10 μm.

13. An electronic device, comprising an electrochemical device, the electrochemical device comprising:
    a cathode;
    an anode; and
    a composite separator;
    wherein the composite separator comprising:
    a first porous substrate;
    a first coating; and
    a cation exchange layer,
    wherein the first coating comprises inorganic particles and a binder, and the first coating is disposed between the first porous substrate and the cation exchange layer,
    wherein the cation exchange layer comprises a polymer binder grafted with a functional group,
    wherein the functional group is selected from the group consisting of an alkali-metal-sulfonic functional group, an alkali-metal-phosphoric functional group and a combination thereof; and
    wherein the composite separator is disposed between the cathode and the anode.

14. The electronic device according to claim 13, wherein the composite separator further comprises a second coating, the second coating comprising a polymer binder.

15. The electronic device according to claim 14, wherein the first porous substrate is disposed between the first coating and the second coating.

16. The electronic device according to claim 14, wherein the first coating is disposed between the first porous substrate and the second coating.

17. The electronic device according to claim 13, wherein the polymer binder is selected from the group consisting of:
   a vinylidene fluoride-hexafluoropropylene copolymer,
   a vinylidene fluoride-trichloroethylene copolymer,
   polyacrylate ester, polyacrylic acid,
   polymethyl methacrylate,
   polyvinylidene fluoride,
   polyacrylonitrile,
   polytetrafluoroethylene,
   polyhexafluoropropylene,
   a styrene-butadiene copolymer;
   and combinations thereof.

18. The electronic device according to claim 13, wherein a grafting concentration of the functional group is from about 0.15 mmol/g to about 0.95 mmol/g, and the thickness of the cation exchange layer is from about 0.5 μm to about 10 μm.

* * * * *